UNITED STATES PATENT OFFICE.

JOHN DIMELOW, OF POST OAK GROVE, TRAVIS COUNTY, ASSIGNOR TO HIMSELF, AND CHARLES W. DEISEN, OF AUSTIN, TEXAS.

MANUFACTURE OF HYDRAULIC CEMENT.

SPECIFICATION forming part of Letters Patent No. 321,589, dated July 7, 1885.

Application filed March 24, 1885. (No specimens.)

*To all whom it may concern:*

Be it known that I, JOHN DIMELOW, of Post Oak Grove, (near Austin,) in the county of Travis and State of Texas, have invented a new and useful Improvement in the Manufacture of Hydraulic Cement, of which the following is a full, clear, and exact description.

The object of this invention is to utilize in the manufacture of cement waste mineral or rejected hydraulic matter, such as decomposed limestone, river deposits, clays, and more particularly such material as is excavated in building railroads through limestone districts. In a great majority of cases I find in railway excavations that the decomposed or rotten limestone is so far decomposed that it requires to be first reduced by grinding or otherwise to a fine powder before or after calcining, and before being cast into water or mixed with other ingredients. This pulverizing or grinding of the calcareous material constitutes the principal feature of this invention, which is an improvement upon my patent dated June 25, 1878, and numbered 205,253.

In preparing the cement I first grind the excavation or refuse matter into fine powder, or reduce it to a thin consistency, and then cast it into water, in order that the different ingredients constituting hydraulic matter may amalgamate, producing a pure hydraulic substance. I then press the material into chunks or bricks, and next, when the bricks or chunks are thoroughly dry, burn at the necessary pitch of heat, and on leaving the furnace this burnt material is then ground into fine powder, the finer the better, producing a high quality of hydraulic cement or hydraulic lime. If this material be pressed or molded into bricks, the said bricks may either be ground into fine powder or they may be set or built in their own cement or mortar, producing one solid mass of indestructible hydraulic stone. If the material be ground, I mix it in about equal parts with the deposit of rivers, or with clay, lime, sand, &c. This mixture I then soak in water for from twelve to twenty-four hours, until a thorough amalgamation is effected. The mixture is then cast into a pug-mill or other mixing-machine, and worked with sufficient clean cold water to reduce the mixture to about the consistency of thick cream. The mixture is then screened and dried in an evaporating-pan or otherwise.

When the water has been evaporated, the hydraulic matter is cut up and dried in the form of chunks or bricks, which, when thoroughly dried, are then baked or burned in a furnace with a slow gradually-increasing heat for from six to eight hours. They are then taken out of the furnace and ground or reduced as fine as practicable.

In this manner the now worthless excavated material in limestone districts may be converted into a high order of hydraulic cement. In the great majority of cases these excavations or minerals consist of a mixture of rotten or decomposed limestone, often interspersed with particles of pure gypsum, shell, chalk, clay or argillite, and other minerals of similar character, which, when treated as described, will produce a hydraulic lime or strong hydraulic cement, which, by proper treatment in mixing with the necessary quantity of sand, will produce a hydraulic mortar for all purposes for which common lime and cement mortar are used, and which at the same time is practically indestructible in air, damp, or water. The pulverizing of the material after burning or calcining greatly increases the hydraulic and cement nature of the mixture, and renders it applicable for use in building railway arches, culverts, buildings, &c., as well as for covering walls and ceilings and making sidewalks, &c.

Having thus described my invention, what I claim as new, and desire to secure by Letters Patent, is—

1. The mode of preparing hydraulic cement from decomposed refuse limestone and the deposits of rivers or similar material, by burning the refuse limestone, pulverizing it, mixing it with the deposit of rivers, soaking the mixture in water, grinding it, sifting it, evaporating the water, burning in a furnace, and, finally, grinding the material to powder, substantially as described.

2. The mode of preparing hydraulic cement from decomposed limestone excavations, which consists in grinding the conglomerated mass into fine powder, casting it into water, molding it into bricks or chunks, burning it, and subsequently grinding it to fine powder.

JOHN DIMELOW.

Witnesses:
H. E. SHELLEY,
L. B. BOBO.